United States Patent
Knörnschild et al.

(10) Patent No.: US 8,038,226 B2
(45) Date of Patent: Oct. 18, 2011

(54) ELECTROPNEUMATIC BRAKING DEVICE OF A RAIL VEHICLE COMPRISING A CONTINUOUS REGULATING RANGE

(75) Inventors: Thomas Knörnschild, München (DE); Timm Simon, München (DE); Martin Heller, Unterschleissheim (DE); Marc-Oliver Herden, München (DE)

(73) Assignee: Knorr-Bremse Systeme Fur Schienenfahrzeuge GmbH, Munich (DE)

( * ) Notice: Subject to any disclaimer, the term of this patent is extended or adjusted under 35 U.S.C. 154(b) by 1116 days.

(21) Appl. No.: 11/569,090

(22) PCT Filed: May 13, 2005

(86) PCT No.: PCT/EP2005/005237
§ 371 (c)(1),
(2), (4) Date: Jul. 27, 2007

(87) PCT Pub. No.: WO2005/110830
PCT Pub. Date: Nov. 24, 2005

(65) Prior Publication Data
US 2007/0290550 A1    Dec. 20, 2007

(30) Foreign Application Priority Data

May 14, 2004    (DE) .......................... 10 2004 024 462

(51) Int. Cl.
*B60T 13/74*    (2006.01)
*B60T 15/14*    (2006.01)
(52) U.S. Cl. ................................ 303/3; 303/15; 303/128
(58) Field of Classification Search ............. 303/3, 9.62, 303/9.66, 9.69, 15, 20, 127, DIG. 1, DIG. 10, 303/191; 188/72.6; 701/70
See application file for complete search history.

(56) References Cited

U.S. PATENT DOCUMENTS

| | | | |
|---|---|---|---|
| 2,147,327 A | 2/1939 | Williams | 303/15 |
| 4,265,489 A | 5/1981 | Meinicke | 303/3 |
| 4,453,777 A | 6/1984 | Newton | 303/2 |
| 4,730,879 A * | 3/1988 | Adachi et al. | 303/116.4 |

(Continued)

FOREIGN PATENT DOCUMENTS

| | | |
|---|---|---|
| DE | 28 01 778 | 7/1979 |
| DE | 38 03 639 | 8/1988 |
| DE | 43 09 386 | 9/1994 |
| EP | 926885 | 11/1959 |
| SU | 806503 B * | 2/1981 |

*Primary Examiner* — Melody Burch
(74) *Attorney, Agent, or Firm* — Barnes & Thornburg LLP

(57) ABSTRACT

The invention relates to an electropneumatic braking system of a rail vehicle, containing a direct-action electropneumatic braking device and an indirect-action compressed-air braking device. The system comprises at least the following components or modules: a) a pressure regulator which produces a pre-control pressure ($C_{v\,direct}$) of the direct brake according to an electric braking pressure request signal of the direct brake, b) a pressure control valve which limits the pre-control pressure ($C_{v\,direct}$) of the direct brake to a pre-determinable maximum pre-control pressure ($C_{vdirect\,max}$) of the direct brake, c) a control valve which generates a pre-control pressure ($C_{v\,indirect}$) of the indirect brake according to a main air guiding pressure (PHL) of the indirect brake, d) a selection device which, from the maximum pre-control pressure of the direct brake ($C_{v\,direct\,max}$) and the pre-control pressure ($C_{v\,indirect}$) of the indirect brake, transmits a force corresponding to the respectively larger pre-control pressure ($C_{v\,direct\,mas}$ or $C_{v\,indirect}$) to a transmission in which the multiplication can be modified by a regulating device according to the respective load state of the rail vehicle. The transmission actuates a relay valve that controls a braking pressure (C) corresponding to the actuation by the transmission.

11 Claims, 4 Drawing Sheets

U.S. PATENT DOCUMENTS

| | | | | |
|---|---|---|---|---|
| RE36,036 E | * | 1/1999 | Engle | 303/3 |
| 6,095,621 A | * | 8/2000 | Wood et al. | 303/22.6 |
| 6,669,308 B1 | | 12/2003 | Aurich et al. | 3/15 |
| 2004/0119331 A1 | * | 6/2004 | Long | 303/3 |

* cited by examiner

ELECTROPNEUMATIC BRAKING DEVICE OF A RAIL VEHICLE COMPRISING A CONTINUOUS REGULATING RANGE

CROSS-REFERENCE TO RELATED APPLICATIONS

The present application claims the benefit of priority to International Patent Application No. PCT/EP2005/05237 filed May 13, 2005, which further claims the benefit of German Patent Application No. 10 2004 024462.6 filed May 14, 2004

BACKGROUND

The invention is based on an electropneumatic brake system of a rail vehicle, containing a direct action electropneumatic brake device and an indirect action compressed-air brake device.

Such an electropneumatic brake system is known, for example, from DE 38 036 39 A1. In this brake system, a signal which corresponds to the axle load is used in the electronic controller to modify a transmission between the brake cylinder request and the brake pressure in the brake cylinder with a load correction. This load signal is applied to a pressure regulator which generates a pilot control pressure of the direct brake as a function of the electric brake pressure request signal of the direct, electronically controlled brake. In contrast, the indirect pneumatic brake includes a control valve which generates a pilot control pressure of the indirect brake as a function of a main air line pressure. The pilot control pressures of the indirect pneumatic brake and of the electronically controlled, direct brake are subjected to boosting by a relay valve or even two relay valves and are combined by a shuttle valve which passes on the larger of the pilot control pressures to a pressure limiting valve in a more or less reliable fashion.

For the indirect pneumatic brake and an emergency brake device, the load signal is used to adjust the pressure limiting valve which limits the brake pressure in the brake cylinder, but only when full braking occurs. Such brake systems have the disadvantage that load correction is not carried out continuously on the service brake and the regulating range is shortened. This fact is represented in the diagram in FIG. 1, which shows the profile of the brake pressure C generated by the direct brake device, plotted against the braking request for three load states: empty, partially laden and fully laden. Accordingly, the full range of the braking request can be regulated completely from 0% to 100% only when the vehicle is fully laden. When the vehicle is empty, the brake pressure C is regulated only up to approximately 30% of the braking request and is limited to a maximum value for a braking request which exceeds this. In an analogous fashion, the regulating range is also restricted when the vehicle is partially laden, which entails disadvantages in terms of the braking distance.

SUMMARY OF THE INVENTION

The present invention is based on the object of further developing an electropneumatic brake system in such a way that the abovementioned disadvantages are avoided.

The invention proposes an electropneumatic brake system of a rail vehicle, containing a direct action electropneumatic braking device and an indirect action compressed-air braking device and further contains a) a pressure regulator which produces a pilot control pressure of the direct brake as a function of an electric brake pressure request signal of the direct brake, b) a pressure limiting valve which limits the pilot control pressure of the direct brake to a predefinable, maximum pilot control pressure of the direct brake, c) a control valve which generates a pilot control pressure of the indirect brake as a function of a main air line pressure of the indirect brake, and d) a selection device which transmits, from the maximum pilot control pressure of the direct brake and the pilot control pressure of the indirect brake, a force corresponding to the respective larger pilot control pressure to a transmission which changes the transmission ratio as a function of the respective load state of the rail vehicle by means of an actuating device and which activates a relay valve which controls a brake pressure in accordance with the activation by the gear mechanism.

The advantages which can be achieved with this arrangement is that load correction is performed continuously on the direct brake device and the regulating range extends over the entire braking request from 0% to 100%. As shown in FIG. 2, the profile of the brake pressure C generated by the direct brake device, plotted against the braking request for three load states: empty, partially laden and fully laden. Accordingly, the full range of the braking request can be regulated completely from 0% to 100% in all load states, as a result of which short braking distances can be achieved in all load states. Pressure limitation does not take place until the braking request of 100% is reached.

The pressure regulator and the pressure limiting valve, the relay valve, the selection device, the gear mechanism and the actuator device may each be accommodated in separate housings which are placed together in a block. This results in a particularly compact design, and in addition the individual functional blocks of the pressure regulator and pressure limiting valve, relay valve, selection device, gear mechanism and the actuating device can be premounted in their respective housing.

According to a further measure, the selection device may be formed by a piston diaphragm arrangement, having a first piston diaphragm which is connected axially fixed to a first piston rod, and a second piston diaphragm which transmits force only in one direction to the first piston rod. A first pressure chamber is subjected to the pilot control pressure of the indirect brake is formed between the first piston diaphragm and the second piston diaphragm, and a pressure chamber which is subjected to the maximum pilot control pressure of the direct brake being formed between the second piston diaphragm and a wall of the housing. This arrangement ensures significantly higher reliability compared to the shuttle valve from the prior art in which undefined switched positions cannot be ruled out.

The transmission is preferably formed by a lever linkage, with the first piston rod, a second piston rod which activates the relay valve and with a toggle lever. The first piston rod is coupled to one end of the toggle lever, and the second piston rod is coupled to its other end It is possible to set the position of a support, arranged between the coupling points, of the toggle lever as a function of the respective load state of the rail vehicle by the actuating device. In particular, the support of the toggle lever can be adjusted by piston of the actuating device. The piston is loaded by a loading pressure.

The relay valve may be composed of a double seat valve having an inlet valve which connects a compressed air supply to at least one brake cylinder, and having an outlet valve which connects the at least one brake cylinder to a venting means.

A particularly simple design is obtained if a valve closing body of the outlet valve is formed at the end of the second piston rod which faces away from the toggle lever and said piston rod is connected axially fixed to a piston or a piston diaphragm which is loaded by the brake pressure in a direction which opens the outlet valve.

The function of the brake system will become clear through the following description of an exemplary embodiment of the invention.

BRIEF DESCRIPTION OF THE DRAWINGS

An exemplary embodiment of the invention is illustrated in the drawing and explained in more detail in the following description. In the drawing.

DETAILED DESCRIPTION OF THE EMBODIMENT

Figure 1:
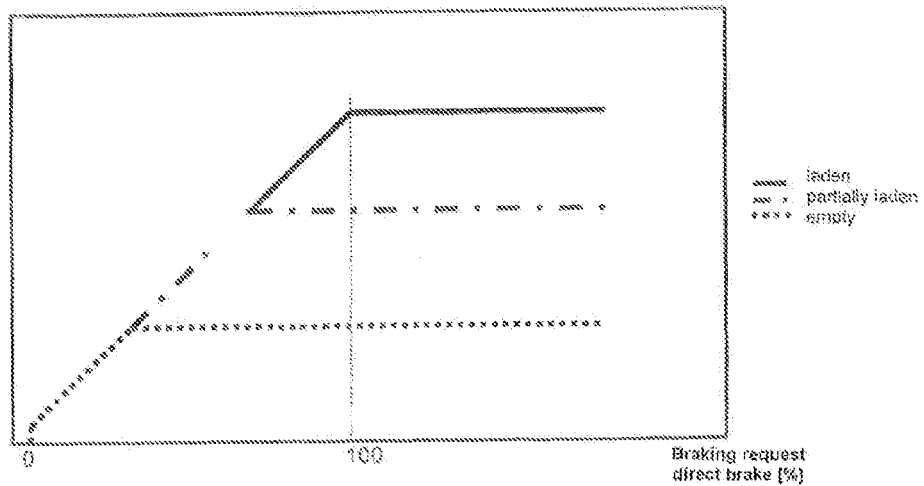
FIG. 1 is a diagram showing the profile of the brake pressure C generated by an electropneumatic brake according to the prior art as a function of the braking request for three load states.
Figure 2:
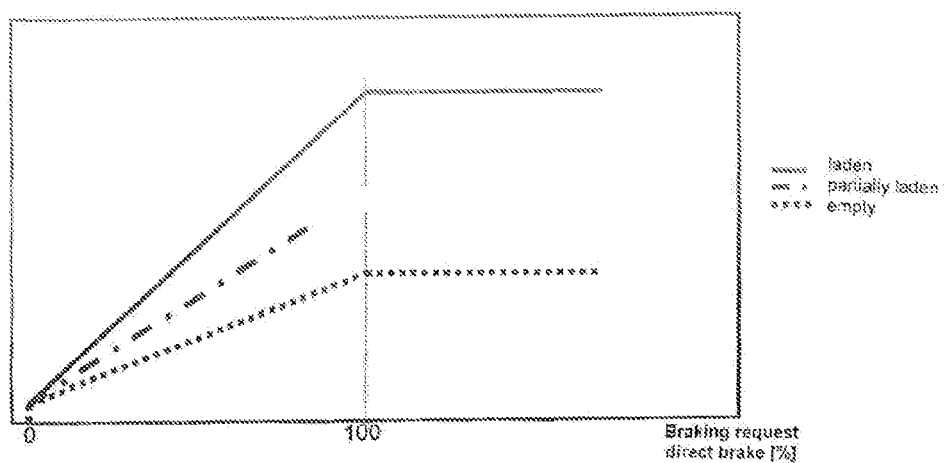
FIG. 2 is a diagram showing the profile of the brake pressure C generated by an electropneumatic brake according to the invention as a function of the braking request for three load states.
Figure 3:
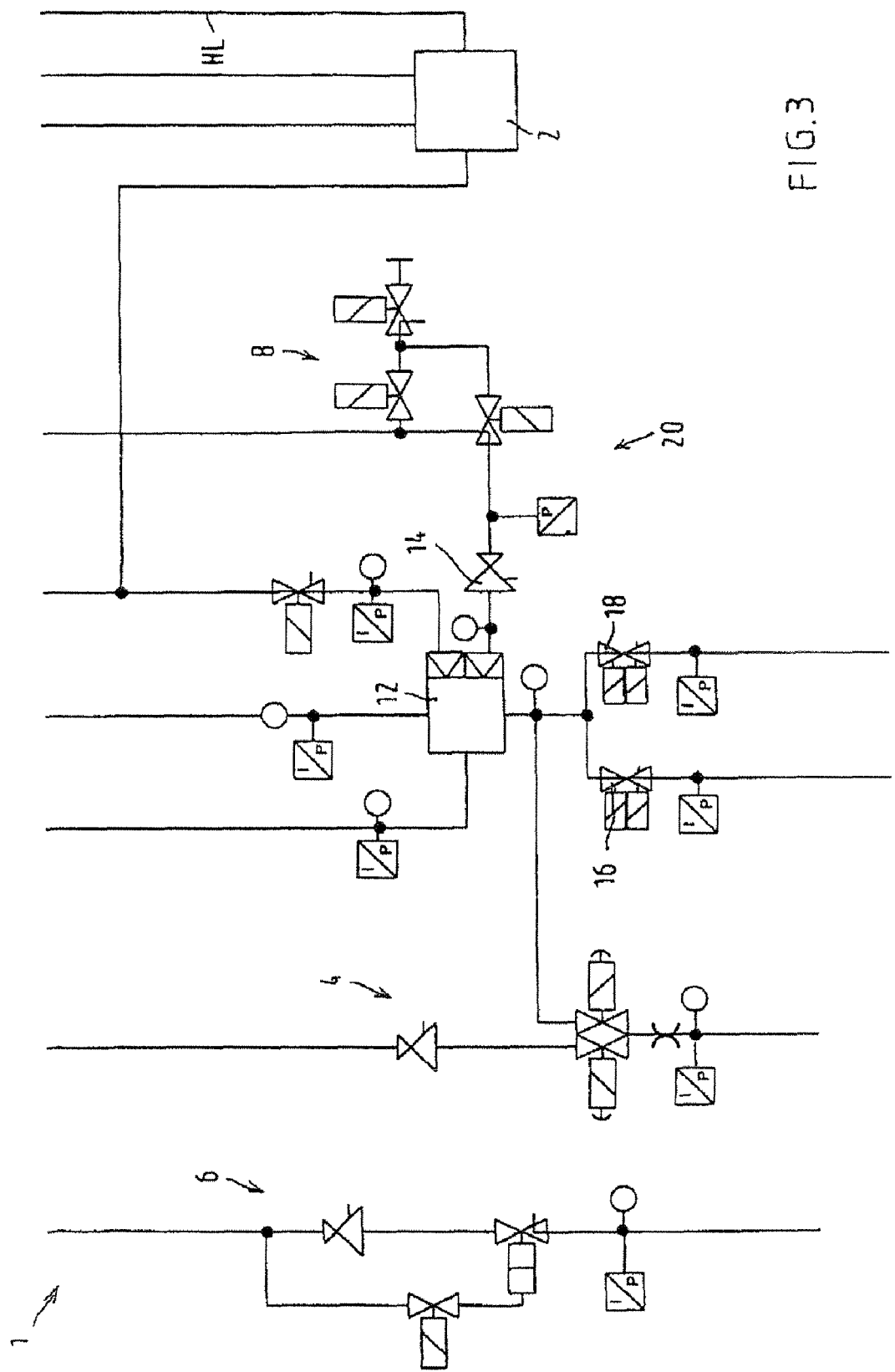
FIG. 3 is a pneumatic diagram of a preferred embodiment of an electropneumatic brake device according to the invention.

FIG. 3 shows a pneumatic diagram of a part 1 of an embodiment of an electropneumatic brake system of a rail vehicle, containing a direct action electropneumatic, microprocessor-controlled brake device and an indirect action compressed-air brake device. This purely pneumatic component is in the form of a load-corrected coupling to an indirectly triggering main air line HL via a control valve 2.

The rail vehicle has a plurality of bogies, each bogie being controlled separately by a compact control module CCM so that for each bogie it is possible to form an individual brake cylinder pressure for one or more brake cylinders. Consequently, a compact control module CCM which has the following functions is provided per bogie:
  electronic processing of the brake signals;
  generation of the brake cylinder pressure for the direct brake device;
  load correction;
  antiskid control;
  monitoring of the parking brake actuation;
  magnetic rail brake actuation;
  generation of the pilot control pressure for the indirect brake device.

An electronic brake control unit CU (shown in FIG. 4) is integrated in each compact control module CCM. The braking equipment is controlled in a superordinate fashion by a brake management system which carries out, monitors and performs diagnostics on all the brake functions of the vehicle. The brake management system controls the following brake systems:
  electrodynamic brake (with maximum priority);
  electropneumatic brake and
  spring loaded brake;
  magnetic rail brake.

Figure 4:
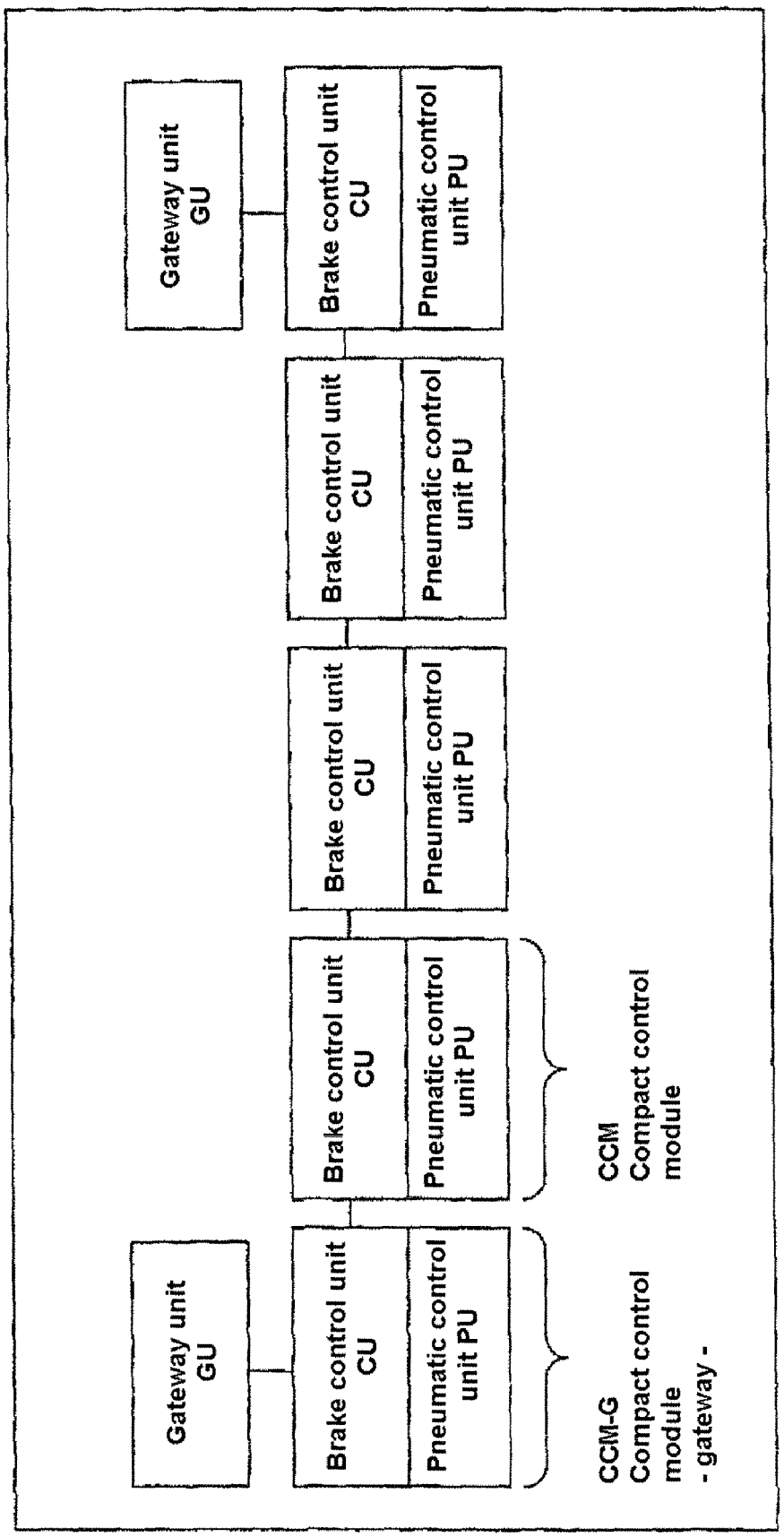
FIG. 4 is a block diagram of brake management system.

Brake management is carried out in a superordinate fashion in a gateway unit GU which in addition to the coordination of the brake function also contains the interface with the train control equipment. All the compact control modules CCM are connected to the gateway unit GU via a brake bus CAN within part of a train. The number of compact control modules CCM which can thus be connected and the length of such a segment depends on the configuration of the train. A 2-3-2 segmentation, as is apparent from FIG. 4, is preferred.

The present brake system permits what is referred to as three-level brake management with a "local brake master" in each compact control module CCM, a "segment brake master" per segment and, subordinate to these, which are connected to one another for example via a multi-vehicle bus (MVB), a "train brake master."

The brake management system has the function of controlling and monitoring all the systems necessary to decelerate the vehicle. These are in particular the electrodynamic brakes which are effective on the sets of drive wheels and are predominantly used for service braking, the direct pneumatic brakes on the carrier axles which are predominantly used to supplement the required braking force in service brakes, the pneumatic brakes on the driven wheel sets and the parking brakes and magnetic rail brakes. The control valve arrangement 4 of the parking brake (not of interest here) and the control valve arrangement 6 of the magnetic rail brake (not of interest here) are illustrated in FIG. 3 for the sake of completeness.

The indirect brake device is not controlled but rather only monitored by the brake management system. This brake device is used in the normal operating mode only for high speed braking, which is carried out purely pneumatically (main air line). When the high-speed brake loop is activated, the brake management system has only a monitoring function.

In the case of emergency braking by the electropneumatic safety loop, the respective brake control unit CU brakes additionally in a redundant fashion—this is likewise not a function of the brake management system but rather of the local control unit.

The brake management system for each permanently coupled unit (six component or four component unit) is carried out by a brake computer within a gateway unit GU module. But if the GU module fails, the brake management can be carried out by a second module which is configured for that purpose (master switchover).

If a plurality of units (at maximum two further units) are coupled together to form a train set, a control unit in the leading unit performs superordinate brake management functions for the train set and coordinates the communication between the brake and train control/driver. For example three functions which can be carried out according to requirements and installation location are anchored in the respective gateway units GU and brake control units CU:

1) Brake control unit CU: local control functions such as actuation, signal processing and diagnostics of all the local devices and functions (for example brake pressure control, antiskid, . . . ) activates in every device of the motor rail unit.
2) Gateway unit GU: segment brake management such as line, coordination and diagnostics within a CAN segment. A CAN segment is also formed from the coupling of, in this case, two to three brake control modules CCM. A gateway unit GU is physically assigned to a brake control unit CU but can also be installed detached from the brake control modules CCM depending on the installation position in the six-component or four-component motor rail unit.

3) Train brake management system: line, coordination and diagnostics in the entire train set, interface with the segment brake managers and with the train control unit/driver. Only activates in one device of the leading motor rail unit.

Depending on the installation location or configuration, only the required functions are activated. When retrofitting is carried out it is determined which control unit performs leading functions. If a unit with current management functions fails, these functions are taken over by the respective other motor rail unit device which is provided for this purpose (master switchover). The local brake control functions such as actuation of the brake pressure, control of the parking brake, antiskid protection, monitoring and diagnostics of faucets and pressure monitors etc. is preferably not of redundant design.

The communication within a motor rail unit as a permanently coupled unit is carried out via the multi-vehicle bus (MVB). A WT bus is used between the motor rail units, via the coupling. The train brake management system communicates in this way with the segment brake managers of the controlled motor rail units.

The direct action electropneumatic brake system is a microprocessor-controlled, electropneumatic compressed air brake system with comfortable flexible service brake via an e/p pressure regulator 8 shown in FIG. 3. Electrical commands which are predefined by the electronic control system via a signal line are converted by the e/p pressure regulator 8 into pneumatic signals, in particular into a pilot control pressure $C_{v\ direct}$ for a relay valve 12 connected downstream. A pressure limiting valve 14 is connected between the e/p pressure regulator 8 and the relay valve 12 and limits the pilot control pressure $C_{v\ direct}$ of the direct brake to a predefinable maximum pilot control pressure $C_{v\ direct\ max}$ of the direct brake. The antiskid control is carried out here by in each case one antiskid valve 16, 18—arranged downstream of the relay valve 12—per wheel set. The emergency brake is implemented by a hard wired emergency brake solenoid valve by bypassing the microprocessor-controlled e/p pressure regulator.

The command "brake" and the braking setpoint value are transmitted from the train control unit to the electronic brake control unit (gateway unit GU). The respective brake manager uses this setpoint value to calculate the brake pressure C which corresponds to the braking force and which is passed on as an electric brake request signal to the compact control modules CCM. The electric brake request signal is converted within the brake control modules by the e/p pressure regulator 8 into a pilot control pressure $C_{v\ direct}$ of the direct brake device. This pilot control pressure $C_{v\ direct}$ is then converted with power amplification into the pneumatic brake pressure C in a load-dependent standard pressure transducer 20 (shown in cross section in FIG. 5) which contains the relay valve 12.

Apart from the prioritized electrodynamic brake, the direct electropneumatic brake device is used exclusively for service braking. At low velocities, the friction brake takes up the entire braking force in a jolt-free fashion until the stationary state is reached, and then automatically applies the parking brake stage in order to prevent the vehicle from rolling back. The direct action electropneumatic brake device is used for the following functions:
  service brake (load dependent): addition of the friction brake to the electrodynamic brake,
  parking brake (load dependent): when the vehicle is stationary it prevents the vehicle from rolling,
  stop brake (load dependent) takes up braking force in the motorized bogies and carrying bogies at low speeds
  emergency brake (load dependent): maximum deceleration in a dangerous situation, with antiskid protection and load correction by emergency brake valves on the compact control modules CCM; the direct brake device also applies the corresponding brake pressure via the e/p pressure regulator 8; under very poor adhesion conditions the driver can activate the sand distributor.

The indirect action compressed-air brake device serves as a fallback level especially when the direct action brake device fails and when UIC vehicles are used for towing away, and ensures the following functions:
  possibility of coupling to UIC vehicles, even with initiation systems, while maintaining the braking capability,
  redundant fallback level of the emergency/high-speed brake,
  redundant emergency braking possibility when the brake management system fails in order to carry on traveling and to clear the line (problems in on-board power system).

In each driver's cab, the driver has a time-dependent driver brake valve and an emergency switch button for activating the indirect brake device. The driver can vent the main air line HL in an infinitely variable fashion by the driver brake valve, and can thus reduce the pressure from 5 bar (release pressure). The maximum braking level is reached when a reduction of 1.5 bar occurs. A further pressure reduction cannot have any further effect. In the case of high-speed brakes, the main air line HL according to UIC is vented to 0 bar in order to shorten the braking and response times.

The pressure in the main air line HL is held at 5 bar in the normal operating mode by a pressure reducing valve and a driver brake valve. The pressure in the main air line HL can also be reduced by activating the emergency switch buttons in the driver's cab and by de-exciting SIFA valves by opening the emergency brake loop, and thus triggering the high-speed braking.

The reduction of pressure in the main air line HL is converted into a pilot control pressure $C_v$ in the control valve 2, said pilot control pressure $C_v$ being fed directly into the compact control module CCM and then being subjected to load correction and power amplification by means of the standard pressure transducer 20. The braking operation can thus be carried out analogously and load-dependently over the entire request range.

High-speed braking can quickly reduce overloading of the working chamber in the control valve 2 (approximation function). Furthermore, a nonreturn valve and a shut-off faucet are provided in order to be able to fill the main air vessel line HB when a vehicle is towed away with an initiation vehicle. In this case, the faucet must be opened. When a vehicle is towed away in the currentless state, i.e., when the high-speed brake loop is not activated, the shut-off faucets of the SIFA valves and the direct brake device must be additionally closed.

In the control valve 2, the control pressure HL (releasing of brakes=5 bar, application=pressure reduction by approximately 0.4 bar, maximum braking force=pressure reduction by 1.5 bar) is converted into a pilot control pressure $C_{v\ indirect}$ for the relay valve 12 which is connected downstream. The control valve 2 is UIC-compatible, that is to say there is complete train compatibility. As a result, the UIC braking times and release times and the maximum brake cylinder pressure of 3.8 bar are also possible.

Some of the brake control modules CCM additionally contain the means for actuating the spring loaded brake. This is implemented in the form of a double pulse solenoid valve with additional manual triggering, which prevents the braking force being superimposed on the spring force at the brake cylinder by virtue of its internal circuit. The status of the spring loaded brake is then diagnosed internally by a pressure sensor which is connected downstream.

Some of the brake control modules CCM additionally contain the means for actuating the electromagnetic rail brake. This is implemented in the form of a solenoid valve for performing pilot control on a large cross section piston valve with pressure reducing means connected upstream.

Figure 5:
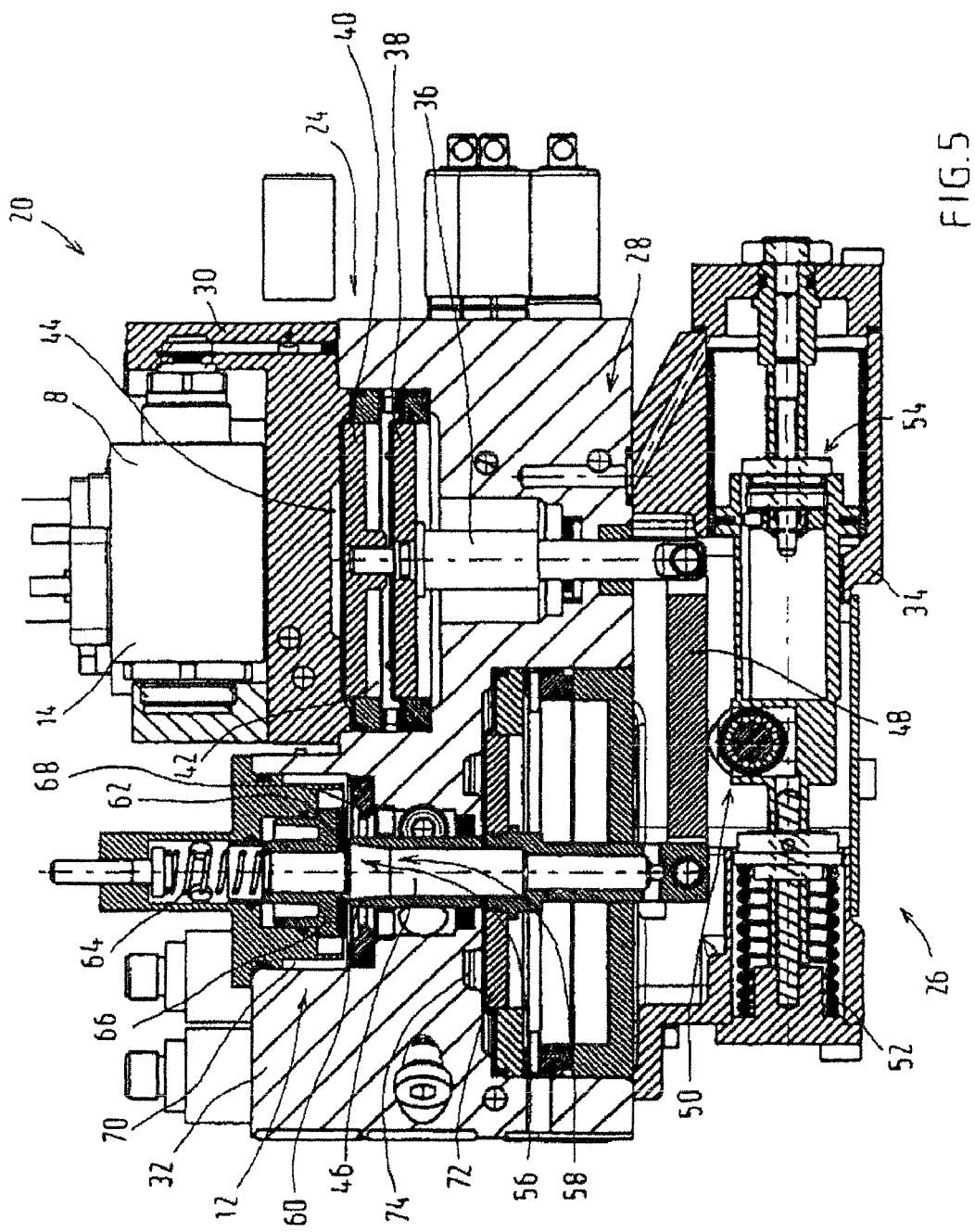
FIG. 5 is a cross-sectional illustration of a pressure transducer according to a preferred embodiment of the invention.

FIG. 5 shows a cross-sectional illustration of the pressure transducer 20 which contains at least the following components or assemblies:

the e/p pressure regulator 8 which generates a pilot control pressure $C_{v\ direct}$ of the direct brake as a function of an electric brake pressure request signal of the direct brake, the pressure limiting valve 14 which limits the pilot control pressure $C_{v\ direct}$ of the direct brake to a predefinable maximum pilot control pressure $C_{v\ direct\ max}$ of the direct brake, and a selection device 24 which transmits, from the maximum pilot control pressure of the direct brake $C_{v\ direct\ max}$ and the pilot control pressure $C_{v\ indirect}$ of the indirect brake, a force corresponding to the respectively larger pilot control pressure $C_{v\ direct\ max}$ or $C_{v\ indirect}$ to a gear mechanism 28 which changes the transmission ratio as a function of the respective load state of the rail vehicle by means of an actuating device 26 and which activates the relay valve 12 which controls a brake pressure C in accordance with the activation by the gear mechanism 28.

Furthermore, the control valve 2, which generates a pilot control pressure $C_{v\ indirect}$ of the indirect brake as a function of a main air line pressure $p_{HL}$ of the indirect brake, can also be integrated into the standard pressure transducer 20, which is however not the case in the present exemplary embodiment.

The e/p pressure regulator 8 and the pressure limiting valve 14, the relay valve 12, the selection device 24, the transmission 28 and the actuating device 26 are each accommodated in separate housings 30, 32, 34 which are placed together in a block and which together form the standard pressure transducer 20. The housing 30 which accommodates the e/p pressure regulator 8 and the pressure limiting valve 14 is connected by flanges, for example at the head end, to the housing 32 in which the relay valve 12, the selection device 24 and the transmission 28 are accommodated. The housing 34 which houses the actuating device 26 is also connected by flanges, for example at the bottom end, to the housing 32. In addition, the emergency brake solenoid valve can also be integrated into the block which forms the standard pressure transducer 20.

The e/p pressure regulator 8 (not shown explicitly for reasons of scale) comprises two solenoid valves, an air admission valve AV and a venting valve VV. Depending on the setpoint pressure set, either the venting valve connects a regulator port to a venting means or the air admission valve connects the regulator port to a compressed air supply. The pressure limiting valve 14 (likewise not explicitly shown) comprises a valve closing element which is loaded by the pilot control pressure $C_{v\ direct}$ to be limited, on the one hand, and by compression springs, on the other, said valve closing element closing the pressure limiting valve 14 if the force resulting from the pilot control pressure $C_{v\ direct}$ is larger than the spring force. The design and the method of functioning of such an e/p pressure regulator 8 and of such a pressure limiting valve 14 are otherwise sufficiently known, and for this reason more details will not be given thereon below.

The selection device 24 is formed by a combined piston diaphragm arrangement, having a first piston diaphragm 38 which is connected axially fixed to a first piston rod 36, and a second piston diaphragm 40 which transmits force only in one direction to the first piston rod 36. A first pressure chamber 42 is subjected to the pilot control pressure $C_{v\ indirect}$ of the indirect compressed air brake device and is formed between the first piston diaphragm 38 and the second piston diaphragm 40. A second pressure chamber 44 is subjected to the maximum pilot control pressure $C_{v\ direct\ max}$ of the direct brake device and is formed between the second piston diaphragm 40 and a bottom of the housing 30 which is connected by flanges at the head end. The two piston diaphragms 38, 40 are held at their edges in the housing 32. To be more precise, the second piston diaphragm 40 is fitted onto the end of the first piston rod 36 in an axially movable fashion such that it can only apply compressive forces to the first piston rod 36 but no extension forces. The active surfaces A of the first and second piston diaphragms 38, 40 are preferably of equal size.

The transmission is formed by a lever linkage 28 containing the first piston rod 36 which is arranged vertically, a second piston rod 46 which is also arranged vertically and activates the relay valve 12, and an essentially horizontal toggle lever 48. The first piston rod 36 is coupled to one end of the toggle lever 48 and the second piston rod 46 is coupled to its other end. It is possible to set the position of a pivot axis 50, which is arranged between the coupling points and serves as a support for the toggle lever 48 as a function of the respective load state of the rail vehicle by means of the actuating device 26. The pivot axis 50 of the toggle lever 48 can then, for example, be adjusted horizontally by a piston 54 of the activating device 26 which is loaded, on the one hand, by the load pressure T which is derived from the respective load and, on the other hand, by a compression spring 52. The adjustment is such that respectively different lever ratios and accordingly also different transmission ratios with respect to vertical movements of the two piston rods 36, 46 occur on the right hand and left hand of the pivot axis 50.

The relay valve 12 includes a double seat valve with a compressed air supply (not shown for reasons of scale) with an inlet valve 56 which connects at least one brake cylinder and with an outlet valve 58 which connects the at least one brake cylinder to a venting means.

The second piston rod 46 activates a valve closing body 60 of the outlet valve 58 which is formed by the end of the second piston rod 46 itself. The valve closing body 60 interacts with a valve seat 62 of the outlet valve 58 on a sleeve 66 which is loaded in the closing direction by a compression spring 64. This sleeve 66 at the same time forms the valve closing body of the inlet valve 56 which, as a result of the effect of the compression spring 64, forms a seal against a valve seat 68 of the inlet valve 56 at the edge of a step in a stepped bore 70 in the housing 32.

If the end 60 of the second piston rod 46 is then lifted off from the valve seat 62 of the outlet valve 58 by downward movement, compressed air can flow from the brake cylinder to the venting means. On the other hand, compressed air from a compressed air supply (also not illustrated for reasons of scale) can continue to flow into the brake cylinder if the valve closing body of the inlet valve 56 in the form of the sleeve 66 is lifted off from the valve seat 68 of the inlet valve 56 at the edge of the stepped bore 70.

Furthermore, the second piston rod 46 is connected axially fixed to a third piston diaphragm 72 which is loaded by the brake pressure C in a direction which opens the outlet valve 58. For this purpose, a third pressure chamber 74, in which the brake pressure C is present, is formed between an active surface, facing the outlet valve 58, of the third piston diaphragm 72 which is attached to the edge of the stepped bore 70, and the housing 32.

Against this background, the method of functioning of the standard pressure transducer 20 is as follows:

In response to an electric brake pressure request signal of the direct electropneumatic brake device, the e/p pressure regulator 8 generates a pilot control pressure $C_{v\ direct}$ which limits the pressure limiting valve 14 accommodated in the same housing 30 to a predefinable maximum pilot control pressure $C_{v\ direct\ max}$ which is present in the second pressure chamber 44. At the same time, the control valve 2 of the indirect compressed air brake generates a pilot control pressure $C_{v\ indirect}$ as a function of the main air line pressure $p_{HL}$ which is dependent on the braking request. The pilot control pressure $C_{v\ indirect}$ is applied to the first pressure chamber 42.

This then results in the following force relationship at the first piston rod 36:

$$F_{piston\ rod} = (C_{v\ direct\ max}A - C_{v\ indirect}A) + C_{v\ indirect}A \quad (1)$$

The bracketed expression ($C_{v\ direct\ max.}\ A - C_{v\ indirect.}\ A$) describes the force on the second piston diaphragm 40 and the expression $C_{v\ indirect}.\ A$ describes the force acting on the first piston diaphragm 38.

If the pilot control pressure $C_{v\ direct\ max}$ of the direct brake device is lower than the pilot control pressure $C_{v\ indirect}$ of the indirect compressed air brake, the second piston diaphragm 40 is moved upwards relative to the first piston rod 36 owing to the bracketed expression ($C_{v\ direct\ max.}\ A - C_{v\ indirect.}\ A$) which is then negative. C Consequently the second piston diaphragm 40 cannot apply any force to the piston rod 36. In contrast, the force $C_{v\ indirect}.\ A$, which acts on the first piston diaphragm 38 and is based on the larger pilot control pressure $C_{v\ indirect}$, is transmitted to the first piston rod 36 by virtue of the axially fixed connection and ensures that the first piston rod 36 moves downwards. This downward movement is converted by the toggle lever 48 into an upward movement of the second piston rod 46, the magnitude of which movement depends on the position of the pivot axis 50 which is in turn influenced by the load pressure T. Generally the following applies: the larger the load pressure T the larger the lever transmission ratio selected at the toggle lever 48. This has to be in order to generate a sufficient brake pressure C. The upward movement of the second piston rod 46 causes the valve closing body of the inlet valve 56 in the form of the sleeve 66 to lift off from the valve seat 68 of the inlet valve 56, allowing compressed air to flow from the compressed air supply into the brake cylinder in order to build up braking force (increasing the pressure).

However, if the pilot control pressure $C_{v\ direct\ max}$ of the direct brake device is higher than the pilot control pressure $C_{v\ indirect}$ of the indirect compressed air brake, the two expressions $C_{v\ indirect}\ A$ with opposite signs in equation (1) cancel one another out. Thus, the force resulting from the higher pilot control pressure $C_{v\ direct\ max}$ acts on the first piston rod 36 and the piston rod 36 is moved downwards. This movement already has the consequences described above for the activation of the relay valve 12.

If only the pilot control pressure $C_{v\ direct\ max}$ of the direct brake device is acting and there is no pilot control pressure $C_{v\ indirect}$ of the indirect compressed air brake, the first pressure chamber 42 is unpressurized. As a result, there is no pressure force acting on the first piston diaphragm 38. The activation force for the relay valve 12 is then received by the lever linkage 28 from the second piston diaphragm 40 to which the pilot control pressure $C_{v\ direct\ max}$ of the direct brake device is applied.

When only the pilot control pressure $C_{v\ indirect}$ of the indirect compressed air brake is present in the first pressure chamber 42 and the pilot control pressure $C_{v\ direct\ max}$ of the direct brake device has failed, the second piston diaphragm 40 is moved upwards. As a consequence, the first pressure chamber 42, to which pressure is applied, without said second piston diaphragm 40, applies a pressure force to the first piston rod 36. The pressure force is then generated by the first piston diaphragm 38 which is loaded by the pilot control pressure $C_{v\ indirect}$ of the indirect compressed air brake.

In order to lower the pressure of the brake pressure C, the pilot control pressure $C_{v\ indirect}$ of the indirect compressed air brake and the pilot control pressure $C_{v\ direct\ max}$ of the direct brake device are lowered. A force which corresponds to the higher of the two pilot control pressures is in turn transmitted to the first piston rod 36. Consequently, there is a reduction in this downward-directed force on the first piston rod 36 counter to which the larger force resulting from the brake pressure C, which continues to be high, at the third piston diaphragm 72 of the second piston rod 46 acts via the toggle lever 48. As a result, the second piston rod 46 is moved downwards and the valve closing body 60 of the outlet valve 58 lifts off from the assigned valve seat 62 in order to vent the brake cylinder (lower pressure).

Between the positions of the relay valve 12 for increasing pressure and lowering pressure there is a closure position in which the brake pressure C and the respectively active pilot control pressure are balanced with one another in such a way that both the inlet valve 56 and the outlet valve 58 are closed so that the brake pressure C is maintained (maintaining pressure).

Although the present invention has been described and illustrated in detail, it is to be clearly understood that this is done by way of illustration and example only and is not to be taken by way of limitation. The scope of the present invention is to be limited only by the terms of the appended claims.

The invention claimed is:

1. An electropneumatic brake system of a rail vehicle, containing a direct action electropneumatic braking device and an indirect action compressed-air braking device, and further comprising:
   a) a pressure regulator which produces a pilot control pressure ($C_{v\ direct}$) of the direct brake as a function of an electric brake pressure request signal of the direct brake,
   b) a pressure limiting valve which limits the pilot control pressure ($C_{v\ direct}$) of the direct brake to a predefinable, maximum pilot control pressure ($C_{v\ direct\ max}$) of the direct brake,
   c) a control valve which generates a pilot control pressure ($C_{v\ indirect}$) of the indirect brake as a function of a main air line pressure ($p_{HL}$) of the indirect brake, and
   d) a selection device which transmits, from the maximum pilot control pressure of the direct brake ($C_{v\ direct\ max}$) and the pilot control pressure ($C_{V\ indirect}$) of the indirect brake, a force corresponding to the respective larger pilot control pressure ($C_{v\ direct\ max}$ or $C_{v\ indirect}$) to a transmission, which changes the transmission ratio as a function of the respective load state of the rail vehicle by an actuating device and, which activates a relay valve, which controls a brake pressure (C) in accordance with the activation by the transmission,
   wherein the selection device is formed by a piston arrangement and/or diaphragm arrangement, having a first active surface which is connected axially fixed to a first piston rod, and a second active surface which transmits force only in one direction to the first piston rod, a first pressure chamber which is subjected to the pilot control pressure ($C_{v\ indirect}$) of the indirect brake being formed between the first active surface and the second active surface, and a second pressure chamber which is subjected to the maximum pilot control pressure $C_{v\ direct\ max}$) of the direct brake being formed between the second active surface and a wall of a housing.

2. The brake system of claim 1, wherein at least the selection device, the transmission and the relay valve are placed together in a common housing.

3. The brake system of claim 1, wherein at least the selection device, the transmission, the relay valve, the pressure regulator, the actuating device and the pressure limiting valve are placed together in a block.

4. The brake system of claim 3, wherein the pressure regulator and the pressure limiting valve are accommodated in a first housing, the relay valve, the selection device and the transmission are accommodated in a second housing and the actuator device is accommodated in a third housing, wherein first, second and third housings are placed together in the block.

5. The brake system of claim 1, wherein the first active surface and the second active surface are formed by piston diaphragms.

6. The brake system of claim 1, wherein the transmission contains: a lever linkage, with the first piston rod, a second piston rod which activates the relay valve, and a toggle lever, wherein the first piston rod is coupled to an end of the toggle lever, and the second piston rod is coupled to an other end of the toggle lever, and wherein a position of a support arranged between coupling points of the toggle lever is set as a function of a load state of the rail vehicle by the actuating device.

7. The brake system of claim 6, wherein the support of the toggle lever is adjusted by an actuating device piston loaded by a loading pressure.

8. The brake system of claim 7, wherein the relay valve is a double seat valve having an inlet valve which connects a compressed air supply to at least one brake cylinder, and having an outlet valve which connects the at least one brake cylinder to a venting means.

9. The brake system of claim 8, wherein the second piston rod activates a valve closing body of the outlet valve and is connected axially fixed to a piston or a piston diaphragm which is loaded via the brake pressure (C) in a direction which opens the outlet valve.

10. The brake system of claim 9, wherein the valve closing body is formed at the end of the second piston rod which faces away from the toggle lever.

11. The brake system of claim 10, wherein the second active surface transmits force to the first piston rod only in a direction which opens the inlet valve.

* * * * *